(12) United States Patent
Iwasaki et al.

(10) Patent No.: US 9,953,746 B2
(45) Date of Patent: Apr. 24, 2018

(54) INSULATED WIRE AND CABLE

(71) Applicant: Hitachi Metals, Ltd., Tokyo (JP)

(72) Inventors: Makoto Iwasaki, Hitachi (JP);
Tamotsu Kibe, Hitachi (JP); Mitsuru Hashimoto, Hitachi (JP); Mamoru Ohashi, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/677,759

(22) Filed: Aug. 15, 2017

(65) Prior Publication Data

US 2018/0075944 A1    Mar. 15, 2018

(30) Foreign Application Priority Data

Sep. 9, 2016  (JP) .................................. 2016-176940
Sep. 9, 2016  (JP) .................................. 2016-176942

(51) Int. Cl.
*H01B 7/29*    (2006.01)
*C08J 7/04*    (2006.01)
*H01B 13/06*   (2006.01)
*H01B 7/17*    (2006.01)
*C08K 5/00*    (2006.01)

(52) U.S. Cl.
CPC .............. *H01B 7/292* (2013.01); *C08J 7/047* (2013.01); *C08K 5/0066* (2013.01); *H01B 7/17* (2013.01); *H01B 13/06* (2013.01); *C08J 2327/04* (2013.01); *C08J 2477/00* (2013.01)

(58) Field of Classification Search
CPC ........... H01B 7/29; H01B 7/292; H01B 7/295
See application file for complete search history.

(56) References Cited

U.S. PATENT DOCUMENTS

2016/0189829 A1    6/2016  Bates et al.

FOREIGN PATENT DOCUMENTS

JP    2013-018932    1/2013

OTHER PUBLICATIONS

European Search Report Application No. 17185208.0-1105 dated Jan. 26, 2018.

*Primary Examiner* — Jeremy C Norris
(74) *Attorney, Agent, or Firm* — Roberts Mlotkowski Safran Cole & Calderon P.C.

(57) ABSTRACT

An insulated wire includes a conductor, and an insulation layer provided around the conductor. The insulation layer includes an inner layer located on a conductor side and an outer layer provided around the inner layer. The inner layer includes a halogen-free resin composition including a base polymer (A). The outer layer includes a cross-linked body obtained by cross-linking a halogen-free flame-retardant resin composition including a base polymer (B) and a halogen-free flame retardant. The base polymer (A) includes a thermoplastic resin (a1) having an aromatic ring in a backbone chain. The base polymer (B) includes a polyolefin component. A thickness of the inner layer is not less than 0.03 mm and not more than 70% of a thickness of the insulation layer.

16 Claims, 1 Drawing Sheet

INSULATED WIRE AND CABLE

BACKGROUND OF THE INVENTION

1. Field of the Invention

The invention relates to an insulated wire and a cable.

2. Description of the Related Art

Insulated wires used in rolling stocks, automobiles and electrical equipment, etc., could be involved in a fire accident or could be worn out by, e.g., contact with another member or rubbing against other insulated wires. Thus, insulated wires are required to have flame retardancy or abrasion resistance to stably function under such conditions.

For example, use of a polymer excellent in flame retardancy such as polyvinyl chloride as a material of the insulation layer and addition of a halogen-based flame retardant to the material of the insulation layer are known as the methods of improving flame retardancy of insulation layer. However, in recent years, halogen-free materials not containing halogen have been used in view of safety in the event of fire or in view of reduction of environmental burdens.

For example, resin compositions in which a halogen-free flame retardant such as metal hydroxide is mixed to polyolefin are known as the halogen-free materials (see, e.g., JP-A 2013-18932).

These resin compositions are generally highly cross-linked to improve mechanical characteristics, such as cut-through properties or abrasion resistance, of the insulation layer.

SUMMARY OF THE INVENTION

If the degree of cross-linking is increased such that the insulation layer can have higher mechanical characteristics, processability of the insulated wires may be impaired. In details, strong chemical bonds are produced in polymer by cross-linking and impart rubber elasticity to the polymer. If the degree of cross-linking in the insulation layer is increased, the insulation layer may be increased in rubber elasticity and thereupon less plastically deformable, causing a decrease in processability of the insulated wires. Thus, it may be difficult to obtain an insulated wire with well-balanced, high level of flame retardancy, mechanical characteristics and wire processability.

Also, in recent years, insulated wires are required not to produce a poisonous gas harmful to human health, such as cyanogen gas or $NO_x$ gas, when burnt.

It is an object of the invention to provide an insulated wire and a cable that are excellent in flame retardancy, mechanical characteristics and wire processability.

It is also an object of the invention to provide an insulated wire and a cable that are excellent in flame retardancy, mechanical characteristics and wire processability and also do not produce a poisonous gas when burnt.

[1] According to an embodiment of the invention, an insulated wire comprises:

a conductor; and an insulation layer provided around the conductor, wherein the insulation layer comprises an inner layer located on the conductor side and an outer layer provided around the inner layer, wherein the inner layer comprises a halogen-free resin composition comprising a base polymer (A), wherein the outer layer comprises a cross-linked body obtained by cross-linking a halogen-free flame-retardant resin composition comprising a base polymer (B) and a halogen-free flame retardant, wherein the base polymer (A) comprises a thermoplastic resin (a1) having an aromatic ring in a backbone chain, wherein the base polymer (B) comprises a polyolefin component, and wherein a thickness of the inner layer is not less than 0.03 mm and not more than 70% of a thickness of the insulation layer.

[2] According to another embodiment of the invention, a cable comprises:

a core comprising an insulated wire formed by providing an insulation layer around a conductor; and a sheath provided around the core, wherein the insulation layer comprises an inner layer located on a conductor side and an outer layer provided around the inner layer, wherein the inner layer comprises a halogen-free resin composition comprising a base polymer (A), wherein the outer layer comprises a cross-linked body obtained by cross-linking a halogen-free flame-retardant resin composition comprising a base polymer (B) and a halogen-free flame retardant, wherein the base polymer (A) comprises a thermoplastic resin (a1) having an aromatic ring in a backbone chain, wherein the base polymer (B) comprises a polyolefin component, and wherein a thickness of the inner layer is not less than 0.03 mm and not more than 70% of a thickness of the insulation layer.

[3] According to an embodiment of the invention, an insulated wire comprises:

a conductor; and an insulation layer provided around the conductor, wherein the insulation layer comprises an inner layer located on a conductor side and an outer layer provided around the inner layer, wherein the inner layer comprises a halogen-free resin composition comprising a base polymer (A), wherein the outer layer comprises a cross-linked body obtained by cross-linking a halogen-free flame-retardant resin composition comprising a base polymer (B) and a halogen-free flame retardant, wherein the base polymer (A) comprises a thermoplastic resin (a1) having an aromatic ring in a backbone chain and not including a nitrogen atom, wherein the base polymer (B) comprising a polyolefin component, and wherein a thickness of the inner layer is not less than 0.03 mm and not more than 70% of a thickness of the insulation layer.

[4] According to another embodiment of the invention, a cable comprises:

a core comprising an insulated wire formed by providing an insulation layer around a conductor; and a sheath provided around the core, wherein the insulation layer comprises an inner layer located on a conductor side and an outer layer provided around the inner layer, wherein the inner layer comprises a halogen-free resin composition comprising a base polymer (A), wherein the outer layer comprises a cross-linked body obtained by cross-linking a halogen-free flame-retardant resin composition comprising a base polymer (B) and a halogen-free flame retardant, wherein the base polymer (A) comprises a thermoplastic resin (a1) having an aromatic ring in a backbone chain and not including a nitrogen atom, wherein the base polymer (B) comprises a polyolefin component, and wherein a thickness of the inner layer is not less than 0.03 mm and not more than 70% of a thickness of the insulation layer.

Effects of the Invention

According to an embodiment of the invention, an insulated wire and a cable can be provided that are excellent in flame retardancy, mechanical characteristics and wire processability.

According to another embodiment of the invention, an insulated wire and a cable can be provided that are excellent in flame retardancy, mechanical characteristics and wire processability and also do not produce a poisonous gas when burnt.

BRIEF DESCRIPTION OF THE DRAWING

Next, the present invention will be explained in more detail in conjunction with an appended drawing, wherein.

DETAILED DESCRIPTION OF THE PREFERRED EMBODIMENTS

First Embodiment

Configuration of Insulated Wire

Figure 1:
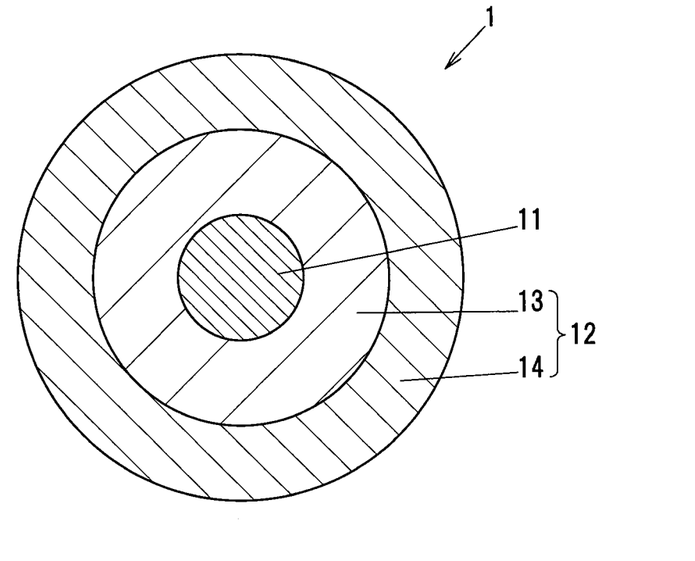
FIG. 1 is a cross sectional view showing an insulated wire in embodiments of the present invention taken perpendicular to the longitudinal direction thereof.

An insulated wire in the first embodiment of the invention will be described blow in conjunction with the drawing. FIG. 1 is a cross sectional view showing an insulated wire in the first embodiment of the invention taken perpendicular to the longitudinal direction thereof. Hereinafter, each of the numerical ranges expressed using "-" includes the numerical values before and after "-" as the lower and upper limits.

As shown in FIG. 1, an insulated wire 1 in the first embodiment is provided with a conductor 11 and an insulation layer 12. The insulation layer 12 is composed of an inner layer 13 and an outer layer 14.

Conductor

As the conductor 11, it is possible to use a commonly-used metal wire, e.g., a copper wire, a copper alloy wire, an aluminum wire, a gold wire or a silver wire, etc. Alternatively, a metal wire of which outer surface is plated with a metal such as tin or nickel may be used. It is also possible to use a bunch-stranded conductor formed by twisting metal strands.

Insulation Layer

As described above, the degree of cross-linking in an insulation layer when formed using a polyolefin component needs to be high to obtain desired mechanical characteristics (e.g., abrasion resistance or cut-through properties, etc.), but when the polyolefin component is highly cross-linked, the insulation layer becomes less plastically deformable and this causes a decrease in wire processability. For this reason, in the first embodiment, the insulation layer 12 is formed not only a polyolefin component which becomes less plastically deformable when cross-kinked, but also a thermoplastic resin having an aromatic ring in the backbone chain which is plastically deformable even after being cross-linked unlike the polyolefin component and does not impair wire processability. In detail, the insulation layer 12 is configured to have a laminated structure composed of the inner layer 13 and the outer layer 14, such that the inner layer 13 is formed of a thermoplastic resin having an aromatic ring in the backbone chain and the outer layer 14 is formed of a polyolefin component. In this configuration, while mechanical characteristics such as abrasion resistance is increased by highly cross-linking the outer layer 14 located on the surface of the insulation layer 12, wire processability can be maintained by providing the plastically-deformable inner layer 13 on the inner side of the insulation layer 12. In addition, since a large amount of halogen-free flame retardant can be mixed to the polyolefin component used to form the outer layer 14 of the insulation layer 12, it is possible to obtain desired high flame retardancy. The insulation layer 12 formed as described above can have well-balanced, high level of flame retardancy, mechanical characteristics and wire processability.

Next, the inner layer 13 and the outer layer 14 which constitute the insulation layer 12 will be described in detail.

Inner Layer

The inner layer 13 is provided around the conductor 11. The inner layer 13 is formed of a halogen-free resin composition which contains a base polymer (A) comprising a thermoplastic resin (a1) having an aromatic ring in the backbone chain. The inner layer 13 is formed by, e.g., extruding the halogen-free resin composition over the conductor 11. The inner layer 13 formed using the thermoplastic resin (a1) is plastically deformable and can maintain wire processability of the insulation layer 12. Since the thermoplastic resin (a1) is plastically deformable even after being cross-linked, the inner layer 13 may be cross-linked or may be formed of a cross-linked body obtained by cross-linking the halogen-free resin composition. In addition, in the first embodiment, it is not necessary to add a flame retardant to the inner layer 13 since the inner layer 13 is covered with the outer layer 14 excellent in flame retardancy and the outer layer 14 is formed to have a predetermined thickness relative to the thickness of the insulation layer 12 so that desired flame retardancy can be maintained.

The halogen-free resin composition used to form the inner layer 13 contains the base polymer (A) which comprises the thermoplastic resin (a1) having an aromatic ring in the backbone chain (hereinafter, also referred to as "component (a1)").

The thermoplastic resin (a1) having an aromatic ring in the backbone chain is more plastically deformable than the polyolefin component after being cross-linked. It is considered that it is because in the component (a1), aromatic rings interact with each other ($\pi$-$\pi$ stacking) and adjacent aromatic rings are likely to interact with each other when strain is applied.

The thermoplastic resin (a1) is preferably a halogen-free engineering plastic having an aromatic ring in the backbone chain, and it is possible to use at least one of, e.g., polybutylene terephthalate, polyethylene terephthalate, polybutylene naphthalate, polyethylene naphthalate, polyamide, polyetherimide, silicone-modified polyetherimide, polyphenylene sulfide, polyphenylene ether, modified polyphenylene ether and polyether ether ketone. Of those, at least one of polybutylene terephthalate and polybutylene naphthalate is preferable since the melting point is low and it can be easily extruded.

Preferably, in addition to the thermoplastic resin (a1), a thermal embrittlement inhibitor (a2) (hereinafter, also referred to as "component (a2)") having a lower glass-transition temperature than the component (a1) is also contained in the base polymer (A) to improve heat aging resistance of the inner layer 13. Since the component (a1) has a glass-transition temperature Tg of not less than 35° C., which is higher than room temperature, and is a hard material, the inner layer 13 containing the component (a1) may be crystallized when heated and become brittle. However, since the component (a2) has a lower Tg than the component (a1) and is softer than the component (a1), the component (a2) when contained in the inner layer 13 can prevent embrittlement by relieving stress in the inner layer 13 generated due to crystallization of the thermoplastic resin (a1) and thus can improve heat aging resistance of the inner layer 13.

The component (a2) is preferably a resin component having high compatibility with the component (a1) and having a glass-transition temperature Tg which is lower than that of the component (a1) and also not more than room temperature (20° C.). It is possible to use, e.g., a modified polyolefin copolymer, a modified silicone and a modified styrene-based elastomer, etc. In detail, the modified polyolefin copolymer which can be used here is a polyolefin copolymer, such as ethylene-acrylic ester copolymer, ethylene-vinyl acetate copolymer, ethylene-propylene copolymer, ethylene-octene copolymer or ethylene-butene copolymer, etc., which is modified with at least one of maleic anhydride, amino group, isocyanate group and glycidyl group. The modified styrene-based elastomer which can be used here is, e.g., a modified butadiene styrene copolymer. Of those, the modified polyolefin copolymer is preferable due to its high compatibility with the component (a1). A glycidyl-modified ethylene-acrylic ester copolymer is more preferable and can be, e.g., ethylene glycidyl methacrylate, etc.

The mixed amount of the thermal embrittlement inhibitor (a2) is not specifically limited, but is preferably not less than 5 parts by mass in 100 parts by mass of the mixture of the thermoplastic resin (a1) and the component (a2) to improve heat aging resistance of the inner layer 13. Meanwhile, when the mixed amount of the component (a2) is increased, the proportion of the component (a1) is reduced and this causes a decrease in mechanical characteristics (especially cut-through properties) of the inner layer 13 which may thus be easily broken. Therefore, the amount of the component (a2) in 100 parts by mass of the mixture of the component (a1) and the component (a2) is preferably not more than 40 parts by mass. That is, it is possible to improve heat aging resistance as well as mechanical strength of the inner layer 13 by mixing the component (a2) so that the amount thereof in 100 parts by mass of the mixture of the component (a1) and the component (a2) is 5 parts by mass-40 parts by mass.

A cross-linking agent or a cross-linking aid according to the cross-linking method is mixed to the resin composition used to form the inner layer 13. There are various cross-linking methods such as chemical cross-linking using organic peroxide, sulfur compound or silane compound, radiation cross-linking using exposure to electron beam or radiation, and cross-linking using other chemical reactions. Any of such cross-linking methods can be used.

In addition to the cross-linking agent or cross-linking aid, it is also possible to add other additives such as flame retardant, flame-retardant aid, ultraviolet absorber, light stabilizer, softener, lubricant, colorant, reinforcing agent, surface active agent, inorganic filler, antioxidant, plasticizer, metal chelator, foaming agent, compatibilizing agent, processing aid and stabilizer.

Outer Layer

The outer layer 14 is provided around the inner layer 13. The outer layer 14 is formed of a cross-linked body obtained by cross-linking a halogen-free flame-retardant resin composition in which a base polymer (B) comprising a polyolefin component and a halogen-free flame retardant are contained. To form the outer layer 14, e.g., the halogen-free flame-retardant resin composition is extruded over the inner layer 13 and is cross-linked. The outer layer 14 is formed by cross-linking the polyolefin component and is excellent in mechanical characteristics such as abrasion resistance or cut-through properties. In addition, the outer layer 14 contains a large amount of halogen-free flame retardant and is thus excellent in flame retardancy. The outer layer 14, which has high rubber elasticity due to cross-linking and is thus less plastically deformable, could impair processability of the insulated wire 1. However, in the first embodiment, the outer layer 14 with a small thickness is formed as part of the insulation layer 12 as described later and thus does not greatly impair wire processability.

The halogen-free flame-retardant resin composition used to form the outer layer 14 contains the base polymer (B) comprising a polyolefin component and, and also contains a halogen-free flame retardant.

The base polymer (B) comprises a halogen-free polyolefin component. The polyolefin component is not specifically limited, but preferably contains a polyolefin (b1) having a melting point of not less than 120° C. (hereinafter also referred to as "component (b1)") to improve mechanical characteristics of the outer layer 14. The component (b1) with a melting point of not less than 120° C. has a relatively high degree of crystallinity and is excellent in mechanical characteristics. As the component (b1) having such properties, it is possible to use, e.g., linear low-density polyethylene (LLDPE), high-density polyethylene (HDPE) and polypropylene, etc. Of those, HDPE is more preferable since mechanical characteristics of the outer layer 14 can be further improved. The melting point described herein means the peak temperature of melting as measured by the DSC method.

It is preferred that the base polymer (B) also contains a polyolefin (b2) having a melting point of less than 120° C. (hereinafter also referred to as "component (b2)") in addition to the component (b1). The component (b2), which has a lower melting point and a lower degree of crystallinity than the component (b1), has low mechanical characteristics but is excellent in additive acceptability (so-called filler acceptability) and is capable of containing a large amount of halogen-free flame retardant. That is, by using a combination of the component (b1) with the component (b2), it is possible to increase the amount of halogen-free flame retardant mixed to the outer layer 14, and thereby possible to improve flame retardancy. As the component (b2) having such properties, it is possible to use, e.g., low-density polyethylene (LDPE), very-low-density polyethylene (VLDPE), ethylene-acrylic ester copolymer, ethylene-vinyl acetate copolymer, ethylene-propylene copolymer, ethylene-octene copolymer, ethylene-butene copolymer and butadiene styrene copolymer, etc. Of those, the ethylene-acrylic ester copolymer is more preferable since flame retardancy of the outer layer 14 can be improved. This copolymer forms a char layer when the outer layer 14 is burnt, thereby inhibiting combustion.

It is preferred that the base polymer (B) also contains an acid-modified polyolefin (b3) (hereinafter also referred to as "component (b3)") in addition to the components (b1) and (b2). Since the component (b3) is acid-modified, the component (b3) can be bound to the halogen-free flame retardant more strongly than the components (b1) and (b2) and thus can improve mechanical characteristics of the outer layer 14. For example, the component (b1) or (b2) modified with an unsaturated carboxylic acid or a derivative thereof can be used as the component (b3). Examples of the unsaturated carboxylic acid used for modification include maleic acid, maleic anhydride and fumaric acid, etc. It is particularly preferable to use an ethylene-acrylic ester-maleic anhydride terpolymer which is obtained by modifying an ethylene-acrylic ester copolymer with a maleic acid.

The base polymer (B) preferably contains 1 part by mass-40 parts by mass of the component (b1), 5 parts by mass-40 parts by mass of the component (b2) and 5 parts by mass-50 parts by mass of the component (b3) where the amount of the mixture of the components (b1) to (b3) is 100 parts by mass. By containing the components (b1) to (b3) at such a ratio, the outer layer 14 can have well-balanced, high level of flame retardancy and mechanical characteristics.

The halogen-free flame retardant contained in the base polymer (B) can be a known compound such as metal hydroxide, clay, silica, zinc stannate, zinc borate, calcium borate, dolomite hydroxide and silicone, etc. Particularly, aluminum hydroxide and magnesium hydroxide, etc., which are metal hydroxides, are preferable. Of those, magnesium hydroxide is more preferable since dehydration reaction occurs at 350° C., which is higher than other metal hydroxides, and flame retardancy can be further improved. These halogen-free flame retardants may be used alone or in combination of two or more. In view of dispersibility in the base polymer (B), the metal hydroxides may be surface-treated with, e.g., a silane coupling agent, a titanate-based coupling agent, or fatty acid such as stearic acid. When high heat resistance is required, a silane coupling agent is used for surface treatment.

The mixed amount of the halogen-free flame retardant can be appropriately changed according to flame retardancy required for the insulated wire 1. The mixed amount of the halogen-free flame retardant is preferably not less than 100 parts by mass with respect to 100 parts by mass of the base polymer (B) so that the insulated wire 1 can have desired flame retardancy. Meanwhile, the mixed amount of the halogen-free flame retardant is preferably not more than 250 parts by mass since low-temperature characteristics of the outer layer 14 may decrease when a large amount of the halogen-free flame retardant is mixed. In other words, by mixing 100 parts by mass-250 parts by mass of the halogen-free flame retardant with respect to 100 parts by mass of the base polymer (B), the outer layer 14 can have flame retardancy as well as low-temperature characteristics.

A cross-linking agent or a cross-linking aid according to the cross-linking method is mixed to the flame-retardant resin composition used to form the outer layer 14, in the same manner as the resin composition used to form the inner layer 13. In addition to the cross-linking agent or cross-linking aid, it is also possible to add other additives such as flame-retardant aid, ultraviolet absorber, light stabilizer, softener, lubricant, colorant, reinforcing agent, surface active agent, inorganic filler, antioxidant, plasticizer, metal chelator, foaming agent, compatibilizing agent, processing aid and stabilizer.

Laminated Structure of the Insulation Layer

As described above, the inner layer 13 contributes to processability of the insulated wire 1 due to plastic deformability but has lower flame retardancy than the outer layer 14 containing a large amount of halogen-free flame retardant and thus may cause a decrease in flame retardancy of the insulation layer 12. On the other hand, the outer layer 14 contributes to mechanical characteristics and flame retardancy of the insulation layer 12 but may cause a decrease in wire processability due to its low plastic deformability. In the first embodiment, the insulation layer 12 is composed of the inner layer 13 and the outer layer 14, such that the thickness of the inner layer 13 is not less than 0.03 mm and also not more than 70% of the thickness of the insulation layer 12. Since the inner layer 13 is formed to have a thickness of not less than 0.03 mm, it is possible to maintain wire processability without greatly impairing plastic deformability of the insulation layer 12. In addition, since the inner layer 13 is formed so that the thickness thereof is not more than 70% of the thickness of the insulation layer 12, it is possible to obtain well-balanced, high level of flame retardancy, mechanical characteristics and wire processability. The thickness of the insulation layer 12 is equal to the total thickness of the inner layer 13 and the outer layer 14.

The thickness of the inner layer 13 is not specifically limited as long as it is not less than 0.03 mm and also not more than 70% of the thickness of the insulation layer 12, but it is preferably not less than 1%, more preferably not less than 10%, of the thickness of the insulation layer 12. When the proportion of the inner layer 13 is within such a range, the insulation layer 12 can have well-balanced various characteristics.

Method of Manufacturing the Insulated Wire

Next, a method of manufacturing the insulated wire 1 will be described.

Firstly, a resin composition used to form the inner layer 13 is prepared by mixing and kneading the materials described above. A known method can be used for the preparation. For example, the resin composition is obtain by pre-blending the materials using a high-speed mixer such as Henschel mixer and subsequently kneading the mixture using a known kneading machine such as Banbury mixer, kneader or roll mill. A flame-retardant resin composition used to form the outer layer 14 is prepared in the same manner.

Following this, the inner layer 13 is formed by extruding the resin composition to a predetermined thickness over the conductor 11 by an extruder. The outer layer 14 is then formed by extruding the flame-retardant resin composition to a predetermined thickness over the inner layer 13. After that, the inner layer 13 and the outer layer 14 are cross-linked by, e.g., exposure to electron beam, thereby obtaining the insulated wire 1 in the first embodiment. The inner layer 13 and the outer layer 14 may be formed by co-extrusion of two resin compositions.

Configuration of Cable

Next, a cable provided with the insulated wires 1 will be described.

The cable is composed of, e.g., a core formed by twisting plural insulated wires 1 and a sheath provided around the core. The insulated wire 1 is excellent in wire processability and mechanical characteristics as described above. Therefore, when the core is formed by twisting plural insulated wires 1, damage on the insulation layer 12 can be prevented while the insulated wires 1 can be well-twisted.

The material of the sheath can be a known component and is not specifically limited. In addition, the number of the insulated wires 1 constituting the core of the cable is not limited to plural, and may be one.

Second Embodiment

Configuration of Insulated Wire

An insulated wire in the second embodiment of the invention will be described blow in conjunction with the drawing. FIG. 1 is a cross sectional view showing an insulated wire in the second embodiment of the invention taken perpendicular to the longitudinal direction thereof. Hereinafter, each of the numerical ranges expressed using "-" includes the numerical values before and after "-" as the lower and upper limits.

As shown in FIG. 1, an insulated wire 1 in the second embodiment is provided with a conductor 11 and an insulation layer 12. The insulation layer 12 is composed of an inner layer 13 and an outer layer 14.

Conductor

As the conductor 11, it is possible to use a commonly-used metal wire, e.g., a copper wire, a copper alloy wire, an aluminum wire, a gold wire or a silver wire, etc. Alternatively, a metal wire of which outer surface is plated with a metal such as tin or nickel may be used. It is also possible to use a bunch-stranded conductor formed by twisting metal strands.

Insulation Layer

As described above, the degree of cross-linking in an insulation layer formed using a polyolefin component needs to be high to obtain desired mechanical characteristics (e.g., abrasion resistance or cut-through properties, etc.), but when the polyolefin component is highly cross-linked, the insulation layer becomes less plastically deformable and this causes a decrease in wire processability. For this reason, in the second embodiment, the insulation layer 12 is formed not only a polyolefin component which becomes less plastically deformable when cross-kinked, but also a thermoplastic resin having an aromatic ring in the backbone chain which is plastically deformable even after being cross-linked unlike the polyolefin component and does not impair wire processability. In detail, the insulation layer 12 is configured to have a laminated structure composed of the inner layer 13 and the outer layer 14, such that the inner layer 13 is formed of a thermoplastic resin having an aromatic ring in the backbone chain and the outer layer 14 is formed of a polyolefin component. In addition, the thermoplastic resin used here does not contain a nitrogen atom to prevent a poisonous gas such as cyanogen gas from being produced when the insulation layer 12 is burnt. In this configuration, while mechanical characteristics such as abrasion resistance is increased by highly cross-linking the surface of the insulation layer 12, wire processability can be maintained by plastic deformability on the inner side of the insulation layer 12. In addition, by using the thermoplastic resin not containing a nitrogen atom to form the inner layer 13, it is possible to prevent a poisonous gas from being produced when the insulation layer 12 is burnt. In addition, since a large amount of halogen-free flame retardant can be mixed to the polyolefin component used to form the outer layer 14 of the insulation layer 12, it is possible to obtain desired high flame retardancy. The insulation layer 12 formed as described above can have well-balanced, high level of flame retardancy, mechanical characteristics and wire processability while a poisonous gas is prevented from produced when burned. Next, the inner layer 13 and the outer layer 14 which constitute the insulation layer 12 will be described in detail.

Inner Layer

The inner layer 13 is provided around the conductor 11. The inner layer 13 is formed of a halogen-free resin composition which contains a base polymer (A) comprising a thermoplastic resin (a1) having an aromatic ring in the backbone chain and not containing a nitrogen atom. The inner layer 13 is formed by, e.g., extruding the halogen-free resin composition over the conductor 11. The inner layer 13 formed using the thermoplastic resin (a1) is plastically deformable and can maintain wire processability of the insulation layer 12. Since the thermoplastic resin (a1) is plastically deformable even after being cross-linked, the inner layer 13 may be cross-linked or may be formed of a cross-linked body obtained by cross-linking the halogen-free resin composition. In addition, in the second embodiment, it is not necessary to add a flame retardant to the inner layer 13 since the inner layer 13 is covered with the outer layer 14 excellent in flame retardancy and the outer layer 14 is formed to have a predetermined thickness relative to the thickness of the insulation layer 12 so that desired flame retardancy can be maintained.

The halogen-free resin composition used to form the inner layer 13 contains the base polymer (A) which comprises the thermoplastic resin (a1) having an aromatic ring in the backbone chain and not containing a nitrogen atom (hereinafter, also referred to as "component (a1)").

The thermoplastic resin (a1) having an aromatic ring in the backbone chain and not containing a nitrogen atom is more plastically deformable than the polyolefin component after being cross-linked. It is considered that it is because in the component (a1), aromatic rings interact with each other ($\pi$-$\pi$ stacking) and adjacent aromatic rings are likely to interact with each other when strain is applied. In addition, since any nitrogen atom is not contained in the chemical structure, a poisonous gas such as cyanogen gas or $NO_x$ gas derived from nitrogen atoms is not produced even when burnt.

The thermoplastic resin (a1) is preferably a halogen-free engineering plastic having an aromatic ring in the backbone chain and not containing a nitrogen atom, and it is possible to use at least one of, e.g., polybutylene terephthalate, polyethylene terephthalate, polybutylene naphthalate, polyethylene naphthalate, polyphenylene sulfide, polyphenylene ether, modified polyphenylene ether and polyether ether ketone. Of those, at least one of polybutylene terephthalate and polybutylene naphthalate is preferable since the melting point is low and it can be easily extruded. Although polyamide and polyetherimide, etc., are thermoplastic resins having an aromatic ring, these contain nitrogen atoms and produce a poisonous gas when burnt.

Preferably, in addition to the thermoplastic resin (a1), a thermal embrittlement inhibitor (a2) (hereinafter, also referred to as "component (a2)") having a lower glass-transition temperature than the component (a1) is also contained in the base polymer (A) to improve heat aging resistance of the inner layer 13. Since the component (a1) has a glass-transition temperature Tg of not less than 35° C., which is higher than room temperature, and is a hard material, the inner layer 13 containing the component (a1) may be crystallized when heated and become brittle. However, since the component (a2) has a lower Tg than the component (a1) and is softer than the component (a1), the component (a2) when contained in the inner layer 13 can prevent embrittlement by relieving stress in the inner layer 13 generated due to crystallization of the thermoplastic resin (a1) and thus can improve heat aging resistance of the inner layer 13.

The component (a2) is preferably a resin component having high compatibility with the component (a1) and having a glass-transition temperature Tg which is lower than that of the component (a1) and also not more than room temperature (20° C.). It is possible to use, e.g., a modified polyolefin copolymer, a modified silicone and a modified styrene-based elastomer, etc. In detail, the modified polyolefin copolymer which can be used here is a polyolefin copolymer, such as ethylene-acrylic ester copolymer, ethylene-vinyl acetate copolymer, ethylene-propylene copolymer, ethylene-octene copolymer or ethylene-butene copolymer, etc., which is modified with at least one of maleic anhydride, amino group, isocyanate group and glycidyl group. The modified styrene-based elastomer which can be used here is, e.g., a modified butadiene styrene copolymer. Of those, the modified polyolefin copolymer is preferable due to its high compatibility with the component (a1). A glycidyl-modified ethylene-acrylic ester copolymer is more preferable and can be, e.g., ethylene glycidyl methacrylate, etc.

The mixed amount of the thermal embrittlement inhibitor (a2) is not specifically limited, but is preferably not less than 5 parts by mass in 100 parts by mass of the mixture of the thermoplastic resin (a1) and the component (a2) to improve heat aging resistance of the inner layer 13. Meanwhile, when the mixed amount of the component (a2) is increased, the proportion of the component (a1) is reduced and this causes a decrease in mechanical characteristics (especially cut-through properties) of the inner layer 13 which may thus be easily broken. Therefore, the amount of the component (a2) in 100 parts by mass of the mixture of the component (a1) and the component (a2) is preferably not more than 40 parts by mass. That is, it is possible to improve heat aging resistance as well as mechanical strength of the inner layer 13 by mixing the component (a2) so that the amount thereof in 100 parts by mass of the mixture of the component (a1) and the component (a2) is 5 parts by mass-40 parts by mass.

A cross-linking agent or a cross-linking aid according to the cross-linking method is mixed to the resin composition used to form the inner layer 13. There are various cross-linking methods such as chemical cross-linking using organic peroxide, sulfur compound or silane compound, radiation cross-linking using exposure to electron beam or radiation, and cross-linking using other chemical reactions. Any of such cross-linking methods can be used.

In addition to the cross-linking agent or cross-linking aid, it is also possible to add other additives such as flame retardant, flame-retardant aid, ultraviolet absorber, light stabilizer, softener, lubricant, colorant, reinforcing agent, surface active agent, inorganic filler, antioxidant, plasticizer, metal chelator, foaming agent, compatibilizing agent, processing aid and stabilizer.

Outer Layer

The outer layer 14 is provided around the inner layer 13. The outer layer 14 is formed of a cross-linked body obtained by cross-linking a halogen-free flame-retardant resin composition in which a base polymer (B) comprising a polyolefin component and a halogen-free flame retardant are contained. To form the outer layer 14, e.g., the halogen-free flame-retardant resin composition is extruded over the inner layer 13 and is cross-linked. The outer layer 14 is formed by cross-linking the polyolefin component and is excellent in mechanical characteristics such as abrasion resistance or cut-through properties. In addition, the outer layer 14 contains a large amount of halogen-free flame retardant and is thus excellent in flame retardancy. Furthermore, the outer layer 14 formed using the polyolefin component does not contain a nitrogen atom and thus does not produce a poisonous gas when burnt, in the same manner of the inner layer 13. The outer layer 14, which has high rubber elasticity due to cross-linking and is thus less plastically deformable, could impair processability of the insulated wire 1. However, in the second embodiment, the outer layer 14 with a small thickness is formed as part of the insulation layer 12 as described later and thus does not greatly impair wire processability.

The halogen-free flame-retardant resin composition used to form the outer layer 14 contains the base polymer (B) comprising a polyolefin component, and also contains a halogen-free flame retardant.

The base polymer (B) comprises a halogen-free polyolefin component. The polyolefin component is not specifically limited, but preferably contains a polyolefin (b1) having a melting point of not less than 120° C. (hereinafter also referred to as "component (b1)") to improve mechanical characteristics of the outer layer 14. The component (b1) with a melting point of not less than 120° C. has a relatively high degree of crystallinity and is excellent in mechanical characteristics. As the component (b1) having such properties, it is possible to use, e.g., linear low-density polyethylene (LLDPE), high-density polyethylene (HDPE) and polypropylene, etc. Of those, HDPE is more preferable since mechanical characteristics of the outer layer 14 can be further improved. The melting point described herein means the peak temperature of melting as measured by the DSC method.

It is preferred that the base polymer (B) also contains a polyolefin (b2) having a melting point of less than 120° C. (hereinafter also referred to as "component (b2)") in addition to the component (b1). The component (b2), which has a lower melting point and a lower degree of crystallinity than the component (b1), has low mechanical characteristics but is excellent in additive acceptability (so-called filler acceptability) and is capable of containing a large amount of halogen-free flame retardant. That is, by using a combination of the component (b1) with the component (b2), it is possible to increase the amount of halogen-free flame retardant mixed to the outer layer 14, and thereby possible to improve flame retardancy. As the component (b2) having such properties, it is possible to use, e.g., low-density polyethylene (LDPE), very-low-density polyethylene (VLDPE), ethylene-acrylic ester copolymer, ethylene-vinyl acetate copolymer, ethylene-propylene copolymer, ethylene-octene copolymer, ethylene-butene copolymer and butadiene styrene copolymer, etc. Of those, the ethylene-acrylic ester copolymer is more preferable since flame retardancy of the outer layer 14 can be improved. This copolymer forms a char layer when the outer layer 14 is burnt, thereby inhibiting combustion.

It is preferred that the base polymer (B) also contains an acid-modified polyolefin (b3) (hereinafter also referred to as "component (b3)") in addition to the components (b1) and (b2). Since the component (b3) is acid-modified, the component (b3) can be bound to the halogen-free flame retardant more strongly than the components (b1) and (b2) and thus can improve mechanical characteristics of the outer layer 14. For example, the component (b1) or (b2) modified with an unsaturated carboxylic acid or a derivative thereof can be used as the component (b3). Examples of the unsaturated carboxylic acid used for modification include maleic acid, maleic anhydride and fumaric acid, etc. It is particularly preferable to use an ethylene-acrylic ester-maleic anhydride terpolymer which is obtained by modifying an ethylene-acrylic ester copolymer with a maleic acid.

The base polymer (B) preferably contains 1 part by mass-40 parts by mass of the component (b1), 5 parts by mass-40 parts by mass of the component (b2) and 5 parts by mass-50 parts by mass of the component (b3) where the amount of the mixture of the components (b1) to (b3) is 100 parts by mass. By containing the components (b1) to (b3) at such a ratio, the outer layer 14 can have well-balanced, high level of flame retardancy and mechanical characteristics.

The halogen-free flame retardant contained in the base polymer (B) can be a known compound such as metal hydroxide, clay, silica, zinc stannate, zinc borate, calcium borate, dolomite hydroxide and silicone, etc. Particularly, aluminum hydroxide and magnesium hydroxide, etc., which are metal hydroxides, are preferable. Of those, magnesium hydroxide is more preferable since dehydration reaction occurs at 350° C., which is higher than other metal hydroxides, and flame retardancy can be further improved. These halogen-free flame retardants may be used alone or in combination of two or more. In view of dispersibility in the base polymer (B), the metal hydroxides may be surface-treated with, e.g., a silane coupling agent, a titanate-based coupling agent, and fatty acid such as stearic acid. When high heat resistance is required, a silane coupling agent is used for surface treatment.

The mixed amount of the halogen-free flame retardant can be appropriately changed according to flame retardancy required for the insulated wire 1. The mixed amount of the halogen-free flame retardant is preferably not less than 100 parts by mass with respect to 100 parts by mass of the base polymer (B) so that the insulated wire 1 can have desired flame retardancy. Meanwhile, the mixed amount of the halogen-free flame retardant is preferably not more than 250 parts by mass since low-temperature characteristics of the outer layer 14 may decrease when a large amount of the halogen-free flame retardant is mixed. In other words, by mixing 100 parts by mass-250 parts by mass of the halogen-free flame retardant with respect to 100 parts by mass of the base polymer (B), the outer layer 14 can have flame retardancy as well as low-temperature characteristics.

A cross-linking agent or a cross-linking aid according to the cross-linking method is mixed to the flame-retardant resin composition used to form the outer layer 14, in the same manner as the resin composition used to form the inner layer 13. In addition to the cross-linking agent or cross-linking aid, it is also possible to add other additives such as flame-retardant aid, ultraviolet absorber, light stabilizer, softener, lubricant, colorant, reinforcing agent, surface active agent, inorganic filler, antioxidant, plasticizer, metal chelator, foaming agent, compatibilizing agent, processing aid and stabilizer.

Laminated Structure of the Insulation Layer

As described above, the inner layer 13 contributes to processability of the insulated wire 1 due to plastic deformability but has lower flame retardancy than the outer layer 14 containing a large amount of halogen-free flame retardant and thus may cause a decrease in flame retardancy of the insulation layer 12. On the other hand, the outer layer 14 contributes to mechanical characteristics and flame retardancy of the insulation layer 12 but may cause a decrease in wire processability due to its low plastic deformability. In the second embodiment, the insulation layer 12 is composed of the inner layer 13 and the outer layer 14, such that the thickness of the inner layer 13 is not less than 0.03 mm and also not more than 70% of the thickness of the insulation layer 12. Since the inner layer 13 is formed to have a thickness of not less than 0.03 mm, it is possible to maintain wire processability without greatly impairing plastic deformability of the insulation layer 12. In addition, since the inner layer 13 is formed so that the thickness thereof is not more than 70% of the thickness of the insulation layer 12, it is possible to obtain well-balanced, high level of flame retardancy, mechanical characteristics and wire processability. Furthermore, both the inner layer 13 and the outer layer 14 do not contain a nitrogen atom and thus do not produce a poisonous gas when burnt. The thickness of the insulation layer 12 is equal to the total thickness of the inner layer 13 and the outer layer 14.

The thickness of the inner layer 13 is not specifically limited as long as it is not less than 0.03 mm and also not more than 70% of the thickness of the insulation layer 12, but it is preferably not less than 1%, more preferably not less than 10%, of the thickness of the insulation layer 12. When the proportion of the inner layer 13 is within such a range, the insulation layer 12 can have well-balanced various characteristics.

Method of Manufacturing the Insulated Wire

Next, a method of manufacturing the insulated wire 1 will be described.

Firstly, a resin composition used to form the inner layer 13 is prepared by mixing and kneading the materials described above. A known method can be used for the preparation. For example, the resin composition is obtain by pre-blending the materials using a high-speed mixer such as Henschel mixer and subsequently kneading the mixture using a known kneading machine such as Banbury mixer, kneader or roll mill. A flame-retardant resin composition used to form the outer layer 14 is prepared in the same manner.

Following this, the inner layer 13 is formed by extruding the resin composition to a predetermined thickness over the conductor 11 by an extruder. The outer layer 14 is then formed by extruding the flame-retardant resin composition to a predetermined thickness over the inner layer 13. After that, the inner layer 13 and the outer layer 14 are cross-linked by, e.g., exposure to electron beam, thereby obtaining the insulated wire 1 in the second embodiment. The inner layer 13 and the outer layer 14 may be formed by co-extrusion of two resin compositions.

Configuration of Cable

Next, a cable provided with the insulated wires 1 will be described.

The cable is composed of, e.g., a core formed by twisting plural insulated wires 1 and a sheath provided around the core. The insulated wire 1 is excellent in wire processability and mechanical characteristics as described above. Therefore, when the core is formed by twisting plural insulated wires 1, damage on the insulation layer 12 can be prevented while the insulated wires 1 can be well-twisted.

The material of the sheath can be a known component and is not specifically limited. In addition, the number of the insulated wires 1 constituting the core of the cable is not limited to plural, and may be one.

EXAMPLES

The invention will be described in more detail below in reference to Examples. However, the invention is not limited thereto.

The following materials were used in Examples and Comparative Examples.

Polybutylene terephthalate (PBT): "NOVADURAN 5026" (melting point: 224° C., glass-transition temperature: 50° C.), manufactured by Mitsubishi Engineering-Plastics Corporation High-density polyethylene (HDPE): "HI-ZEX 5305E" (melting point: 131° C.), manufactured by Prime Polymer Co., Ltd.

Ethylene-acrylic ester copolymer (EEA): "Rexpearl A1150" (melting point: 100° C.), manufactured by Japan Polyethylene Corporation
Ethylene-ethyl acrylate-maleic anhydride terpolymer (M-EEA): "BONDINE LX4110" (melting point: 107° C.), manufactured by Arkema
Ethylene-glycidyl methacrylate (E-GMA): "Bondfast E" (glass-transition temperature: −26° C.), manufactured by Sumitomo Chemical Co., Ltd.
Halogen-free flame retardant (magnesium hydroxide): "Kisuma 5L", manufactured by Kyowa Chemical Industry Co., Ltd
Antioxidant (pentaerythritol tetrakis[3-(3,5-di-tert-butyl-4-hydroxyphenyl)propionate]): "Irganox 1010", manufactured by BASF
Antioxidant (2',3-bis[[3-3,5-di-tert-butyl-4-hydroxyphenyl]propionyl]]propionohydrazid): "Irganox MD1024", manufactured by BASF
Cross-linking agent (trimethylolpropane trimethacrylate): "TMPT", manufactured by Shin-Nakamura Chemical Co., Ltd.
Processing aid (zinc stannate): "SZ-P", manufactured by Sakai Chemical Industry Co., Ltd.
Anti-hydrolysis agent (carbodiimide-modified isocyanate): "Carbodiimide", manufactured by Nisshinbo Chemical Inc.

Manufacturing of Insulated Wire

Example 1

Firstly, a halogen-free resin composition for inner layer and a halogen-free flame-retardant resin composition for outer layer were prepared using the respective materials described above.

In detail, as shown in Table 1, 100 parts by mass of polybutylene terephthalate (PBT) as the thermoplastic resin (a1) having an aromatic ring in the backbone chain and not containing a nitrogen atom, 1 part by mass of carbodiimide as the other additive 2 and 1 part by mass of antioxidant (Irganox MD1024) also as the other additive 2 were mixed and kneaded by a two-screw extruder (screw diameter: 30 mm, L/D=30), and the halogen-free resin composition for inner layer was thereby prepared.

Meanwhile, 40 parts by mass of HDPE as the polyolefin (b1) having a melting point of not less than 120° C., 30 parts by mass of EEA as the polyolefin (b2) having a melting point of less than 120° C., 30 parts by mass of M-EEA as the acid-modified polyolefin (b3), 150 parts by mass of magnesium hydroxide as the halogen-free flame retardant, 2 parts by mass of antioxidant (Irganox 1010) as the other additive 1, 4 parts by mass of cross-linking agent (TMPT) also as the other additive 1 and 1 part by mass of processing aid (zinc stannate) also as the other additive 1 were mixed and kneaded by a 14-inch open roll mill, and the halogen-free flame-retardant resin composition for outer layer was thereby prepared.

Next, the inner and outer layers were formed on a conductor by extruding the halogen-free resin composition for inner layer and the halogen-free flame-retardant resin composition for outer layer, thereby obtaining an insulated wire.

In detail, a stranded conductor having an outer diameter of 0.88 mm formed by twisting nineteen 0.18 mm-outer diameter strands was prepared as the conductor. Next, the inner and outer layers were formed on the conductor by co-extrusion of the halogen-free resin composition for inner layer and the halogen-free flame-retardant resin composition for outer layer to respective predetermined thicknesses and cross-linking the extruded resin compositions by exposure to electron beam, thereby obtaining the insulated wire. In Example 1, the inner layer had a thickness of 0.1 mm, the outer layer had a thickness of 0.16 mm, the thickness of the inner layer was 38% of the insulation layer, and the insulated wire had an outer diameter of 1.4 mm.

TABLE 1

|  |  |  |  | Examples | | | | | | | | |
|---|---|---|---|---|---|---|---|---|---|---|---|---|
|  |  |  |  | 1 | 2 | 3 | 4 | 5 | 6 | 7 | 8 | 9 |
| Insulation layer | Outer Layer | Component (b1) | HDPE | 40 | 40 | 40 | 40 | 40 | 40 | 40 | 40 | 40 |
|  |  | Component (b2) | EEA | 30 | 30 | 30 | 30 | 30 | 30 | 30 | 30 | 30 |
|  |  | Component (b3) | M-EEA | 30 | 30 | 30 | 30 | 30 | 30 | 30 | 30 | 30 |
|  |  | Flame retardant | Magnesium hydroxide | 150 | 150 | 150 | 150 | 150 | 100 | 80 | 250 | 280 |
|  |  | Other additives 1 |  | 7 | 7 | 7 | 7 | 7 | 7 | 7 | 7 | 7 |
|  | Inner Layer | Component (a1) | PBT | 100 | 100 | 100 | 95 | 60 | 100 | 100 | 100 | 100 |
|  |  | Component (a2) | E-GMA | — | — | — | 5 | 40 | — | — | — | — |
|  |  | Other additives 2 |  | 2 | 2 | 2 | 2 | 2 | 2 | 2 | 2 | 2 |
|  |  | Thickness of Inner layer [mm] |  | 0.1 | 0.03 | 0.18 | 0.1 | 0.1 | 0.1 | 0.1 | 0.1 | 0.1 |
|  |  | Thickness of Outer layer [mm] |  | 0.16 | 0.22 | 0.08 | 0.16 | 0.16 | 0.16 | 0.16 | 0.16 | 0.16 |
|  |  | Proportion of Inner layer [%] |  | 38 | 12 | 69 | 38 | 38 | 38 | 38 | 38 | 38 |
| Evaluation |  | Wire processability [°] |  | 25 | 32 | 18 | 26 | 35 | 28 | 30 | 23 | 20 |
|  |  |  |  | ◯ | ◯ | ◯ | ◯ | ◯ | ◯ | ◯ | ◯ | ◯ |
|  |  | Cur-through [N] |  | 130 | 90 | 150 | 125 | 75 | 130 | 130 | 130 | 130 |
|  |  | (Mechanical characteristics) |  | ◎ | ◯ | ◯ | ◯ | ◯ | ◎ | ◎ | ◎ | ◎ |
|  |  | Flame retardancy 1 (vertical) [mm] |  | 200 | 150 | 460 | 210 | 210 | 390 | 460 | 150 | 110 |
|  |  |  |  | ◎ | ◎ | Δ | ◎ | ◎ | ◯ | Δ | ◎ | ◎ |
|  |  | Flame retardancy 2 (horizontal) |  | ◯ | ◯ | ◯ | ◯ | ◯ | ◯ | ◯ | ◯ | ◯ |
|  |  | Evaluation at low temperature (low-temperature characteristics) |  | ◯ | ◯ | ◯ | ◯ | ◯ | ◯ | ◯ | ◯ | Δ |
|  |  | Heat aging evaluation [h] |  | 220 | 260 | 200 | 260 | 380 | 230 | 220 | 210 | 200 |
|  |  | (Heat resistance) |  | ◎ | ◯ | Δ | ◯ | ◯ | ◯ | ◯ | ◯ | ◯ |
|  |  | Overall evaluation |  | ◎ | ◎ | ◯ | ◎ | ◎ | ◎ | ◯ | ◎ | ◯ |

Examples 2 and 3

Insulated wires in Examples 2 and 3 were made in the same manner as Example 1, except that the thicknesses of the inner and outer layers and the proportion of the inner layer were changed as shown in Table 1.

Examples 4 and 5

Insulated wires in Examples 4 and 5 were made in the same manner as Example 1, except that E-GMA as the thermal embrittlement inhibitor (a2) and PBT mixed at a predetermined ratio were contained in the halogen-free resin composition for inner layer as shown Table 1.

Examples 6 to 9

Insulated wires in Examples 6 to 9 were made in the same manner as Example 1, except that the amount of the halogen-free flame retardant mixed to the halogen-free flame-retardant resin composition for outer layer was changed from 150 parts by mass respectively to 100 parts by mass, 80 parts by mass, 250 parts by mass and 280 parts by mass as shown in Table 1.

Comparative Example 1

An insulated wire in Comparative Example 1 was made in the same manner as Example 1, except that HDPE was used instead of PBT to form the halogen-free resin composition for inner layer as shown in Table 2.

Comparative Examples 2 and 3

Insulated wires in Comparative Examples 2 and 3 were made in the same manner as Example 1, except that the thicknesses of the inner and outer layers and the proportion of the inner layer were changed as shown in Table 2.

Comparative Example 4

An insulated wire in Comparative Example 4 was made in the same manner as Example 1, except that the halogen-free flame retardant was not mixed to the halogen-free flame-retardant resin composition for outer layer as shown in Table 2.

Evaluation Methods

The obtained wires were evaluated by the following methods.

Wire Processability

Processability of each insulated wire was evaluated in accordance with EN 50305.5.6. In detail, a 200 mm-long insulated wire with a weight was vertically suspended with a load of 5.5N. Next, the suspended insulated wire was heated at 80° C. for 24 hours and was then kept at a temperature of 20° C. for 72 hours. Then, after removing the weight, the insulated wire was bent by placing around a 7 mm-diameter mandrel and the insulated wire to which a weight was attached again was kept in the 90° bent state for 5 minutes. Then, the weight was removed and the bent angle of the insulated wire released from bending was measured. In these Examples, the wires with the angle of not more than 40° were judged as having excellent wire processability (◯), and others were judged as having low wire processability (✗).

TABLE 2

|  |  |  |  | Comparative Examples | | | |
|---|---|---|---|---|---|---|---|
|  |  |  |  | 1 | 2 | 3 | 4 |
| Insulation layer | Outer Layer | Component (b1) | HDPE | 40 | 40 | 40 | 40 |
|  |  | Component (b2) | EEA | 30 | 30 | 30 | 30 |
|  |  | Component (b3) | M-EEA | 30 | 30 | 30 | 30 |
|  |  | Flame retardant | Magnesium hydroxide | 150 | 150 | 150 | — |
|  |  | Other additives 1 |  | 7 | 7 | 7 | 7 |
|  | Inner Layer | Component (a1) | PBT | — | 100 | 100 | 95 |
|  |  | Component (a2) | HDPE | 100 | — | — | 5 |
|  |  | Other additives 2 |  | 2 | 2 | 2 | 2 |
|  |  | Thickness of Inner layer [mm] |  | 0.1 | 0.02 | 0.19 | 0.1 |
|  |  | Thickness of Outer layer [mm] |  | 0.16 | 0.23 | 0.07 | 0.16 |
|  |  | Proportion of Inner layer [%] |  | 38 | 8 | 73 | 38 |
| Evaluation |  | Wire processability [°] |  | 45 | 42 | 17 | 29 |
|  |  |  |  | ✗ | ✗ | ◯ | ◯ |
|  |  | Cur-through [N] |  | 75 | 88 | 153 | 130 |
|  |  | (Mechanical characteristics) |  | ◯ | ◯ | ◯ | ◯ |
|  |  | Flame retardancy 1 |  | 200 | 140 | 470 | 470 |
|  |  | (vertical) [mm] |  | ◉ | ◉ | Δ | Δ |
|  |  | Flame retardancy 2 (horizontal) |  | ◯ | ◯ | ✗ | ✗ |
|  |  | Evaluation at low temperature (low-temperature characteristics) |  | ◯ | ◯ | ◯ | ◯ |
|  |  | Heat aging evaluation [h] |  | 300 | 260 | 150 | 260 |
|  |  | (Heat resistance) |  | ◉ | ◯ | Δ | ◯ |
|  |  | Overall evaluation |  | ✗ | ✗ | ✗ | ✗ |

Cut-Through Properties

Cut-through properties (mechanical characteristics) of each insulated wire were evaluated in accordance with EN 50305.5.6. In detail, the insulated wire was arranged on a 0.45 mm-diameter needle to form a cross shape, a load was gradually applied thereto at 1N/s, and the load at which the insulation layer was broken and the conductor came into contact with the needle was measured. In these Examples, it was judged that the wires had better mechanical characteristics when the measured load was larger. The wires were evaluated as having excellent mechanical characteristics (⊚) when the load was not less than 100N, good (○) when less than 100N and not less than 70N, acceptable (Δ) when less than 70N and not less than 50N, and low (×) when less than 50N.

Flame Retardancy 1

Flame retardancy of each insulated wire was evaluated by a vertical flame test in accordance with EN 50265-1-2. In detail, an insulated wire was held vertical, and a flame of a burner was applied to the insulated wire at a position 475 mm from the top end at an angle of 45° for 60 seconds. After removing the burner and extinguishment of fire, a char length on the insulation layer was measured as the extent of combustion of the insulation layer. In these Examples, it was judged that the wires had better flame retardancy when the char length was shorter. The wires with the char length of less than 300 mm were regarded as "excellent (⊚)", the wires with the char length of not less 300 mm and not more than 400 mm were regarded as "good (○)", and the wires with the char length of than 400 mm were regarded as "acceptable (Δ)".

Flame retardancy 2

Flame retardancy of each insulated wire was evaluated by a horizontal flame in accordance with JIS C 3005. In detail, a flame of a burner was applied to the center of the horizontally-held insulated wire from below for 10 seconds, and time from removal of the burner to fire extinguishment was measured. In these Examples, it was judged that the wires had better flame retardancy when the time was shorter. The wires self-extinguished within 15 seconds were regarded as "good (○)", and the wires not self-extinguished were regarded as "bad (×)".

Low-Temperature Characteristics

Low-temperature characteristics of each insulated wire were evaluated in accordance with EN 60811-1-4.8.1. In detail, the insulated wire was wound around a 5.6 mm-diameter mandrel in a −40° C. atmosphere. The wires with no cracks on the insulation layer were evaluated as having excellent low-temperature characteristics (○), and the wires with cracks were evaluated as having poor low-temperature characteristics (Δ).

Heat Aging Resistance

To measure exposure time until breakage of the insulation layer, the insulated wire was exposed to a 170° C. atmosphere, was taken out, and was wound around a 10 mm-diameter mandrel. In these Examples, it was judged that the wires had better heat aging resistance when the exposure time was longer. The wires were evaluated as excellent (⊚) when the exposure time was more than 300 hours, good (○) when the exposure time was not less than 200 hours and less than 300 hours, acceptable (Δ) when the exposure time was not less than 100 hours and less than 200 hours, and bad (×) when the exposure time was less than 100 hours.

Overall Evaluation

The overall evaluation was rated as "excellent (⊚)" when all evaluation results were "⊚" and "○", rated as "good (○)" when the evaluation results were "○" and "Δ", and rated as "bad (×)" when "×" was included.

Evaluation Results

The evaluation results are shown in Tables 1 and 2.

In Examples 1 to 9, since the thickness of the inner layer having a predetermined composition was not less than 0.03 mm and the proportion of the thickness of the inner layer was in the range of not more than 70%, flame retardancy, mechanical characteristics, wire processability, low-temperature characteristics and heat aging resistance were obtained in a well-balanced manner. In addition, since the inner and outer layers did not contain a nitrogen atom, a poisonous gas such as cyanogen gas derived from nitrogen atoms was not produced when burnt.

Particularly, flame retardancy obtained in Examples 1 and 2 was higher than Example 3 since the proportion of the thickness of the inner layer was smaller.

In Examples 4 and 5, heat aging resistance was further improved by mixing the thermal embrittlement inhibitor (a2) to the inner layer as compared to Example 1 in which the thermal embrittlement inhibitor (a2) was not mixed. That is, heat aging resistance was further improved while achieving well-balanced wire processability, mechanical characteristics, flame retardancy and low-temperature characteristics.

In Examples 6 to 9, the amount of the halogen-free flame retardant mixed to the outer layer was respectively 100 parts by mass, 80 parts by mass, 250 parts by mass and 280 parts by mass. As a result, it was confirmed that not less than 100 parts by mass of the halogen-free flame retardant should be mixed to obtain desired flame retardancy. It was also confirmed that the mixed amount of the halogen-free flame retardant should be not more than 250 parts by mass to maintain low-temperature characteristics at high level.

In Comparative Example 1, since HDPE was used to form the inner layer, the insulation layer became less plastically deformable due to cross-linking and wire processability was thus impaired.

In Comparative Example 2, since the inner layer had a thickness of 0.02 mm and was too thin, it was not possible to maintain high wire processability.

In Comparative Example 3, since the proportion of the inner layer having low flame retardancy was excessively high, the insulation layer as a whole could not maintain high flame retardancy.

In Comparative Example 4, since the halogen-free flame retardant was not mixed to the outer layer, the insulation layer as a whole could not maintain high flame retardancy.

As described above, according to the invention, by providing the insulation layer composed of the predetermined inner and outer layers, it is possible to obtain well-balanced, high level of flame retardancy, mechanical characteristics and wire processability and it is also possible to prevent a poisonous gas from being produced when burnt.

Preferred Embodiments of the Invention

Preferred embodiments of the invention will be described below.

[1] An aspect of the invention provides an insulated wire comprising:
a conductor; and
an insulation layer provided around the conductor,
wherein the insulation layer comprises an inner layer located on the conductor side and an outer layer provided around the inner layer, the inner layer is formed of a halogen-free resin composition comprising a base polymer (A), the outer layer comprises a cross-linked body obtained by cross-linking a halogen-free flame-retardant resin composition comprising a base polymer (B) and a halogen-free flame retardant, the base polymer (A) comprising a thermoplastic resin (a1) having an aromatic ring in the backbone chain and the base polymer (B) comprising a polyolefin component, and the thickness of the inner layer is not less than 0.03 mm and also not more than 70% of the thickness of the insulation layer.

[2] In the insulated wire described in [1], preferably, the thermoplastic resin (a1) comprises at least one of polybutylene terephthalate, polyethylene terephthalate, polybutylene naphthalate, polyethylene naphthalate, polyamide, polyetherimide, silicone-modified polyetherimide, polyphenylene sulfide, polyphenylene ether, modified polyphenylene ether and polyether ether ketone.

[3] In the insulated wire described in [1] or [2], preferably, the thermoplastic resin (a1) comprises at least one of polybutylene terephthalate and polybutylene naphthalate.

[4] In the insulated wire described in any one of [1] to [3], preferably, the halogen-free resin composition used to form the inner layer contains not less than 5 parts by mass and not more than 40 parts by mass of a thermal embrittlement inhibitor (a2) with respect to 100 parts by mass of the base polymer (A), the thermal embrittlement inhibitor (a2) having a lower glass-transition temperature than the thermoplastic resin (a1).

[5] In the insulated wire described in [4], preferably, the thermal embrittlement inhibitor (a2) comprises at least one of a modified polyolefin copolymer, a modified silicone and a modified styrene-based elastomer.

[6] In the insulated wire described in [4] or [5], preferably, the thermal embrittlement inhibitor (a2) has a glass-transition temperature of not more than 20° C.

[7] In the insulated wire described in any one of [4] to [6], preferably, the thermal embrittlement inhibitor (a2) comprises an ethylene-acrylic ester copolymer modified with glycidyl.

[8] In the insulated wire described in any one of [4] to [7], preferably, the thermal embrittlement inhibitor (a2) comprises ethylene glycidyl methacrylate.

[9] In the insulated wire described in any one of [1] to [8], preferably, the polyolefin component comprises not less than 1 part by mass and not more than 40 parts by mass of a polyolefin (b1) having a melting point of not less than 120° C., not less than 5 parts by mass and not more than 40 parts by mass of a polyolefin (b2) having a melting point of less than 120° C. and not less than 5 parts by mass and not more than 50 parts by mass of an acid-modified polyolefin (b3) so that the total amount thereof is 100 parts by mass.

[10] In the insulated wire described in any one of [1] to [9], preferably, the halogen-free flame-retardant resin composition used to form the outer layer contains not less than 100 parts by mass and not more than 250 parts by mass of the halogen-free flame retardant with respect to 100 parts by mass of the base polymer (B).

[11] In the insulated wire described in any one of [1] to [10], preferably, the halogen-free flame retardant comprises a metal hydroxide.

[12] In the insulated wire described in [11], preferably, the metal hydroxide is magnesium hydroxide.

[13] Another aspect of the invention provides a cable, comprising:
a core comprising an insulated wire(s) formed by providing an insulation layer around a conductor; and
a sheath provided around the core,
wherein the insulation layer comprises an inner layer located on the conductor side and an outer layer provided around the inner layer, the inner layer is formed of a halogen-free resin composition comprising a base polymer (A), the outer layer comprises a cross-linked body obtained by cross-linking a halogen-free flame-retardant resin composition comprising a base polymer (B) and a halogen-free flame retardant, the base polymer (A) comprising a thermoplastic resin (a1) having an aromatic ring in the backbone chain and the base polymer (B) comprising a polyolefin component, and the thickness of the inner layer is not less than 0.03 mm and also not more than 70% of the thickness of the insulation layer.

[14] An aspect of the invention provides an insulated wire comprising:
a conductor; and
an insulation layer provided around the conductor,
wherein the insulation layer comprises an inner layer located on the conductor side and an outer layer provided around the inner layer, the inner layer is formed of a halogen-free resin composition comprising a base polymer (A), the outer layer comprises a cross-linked body obtained by cross-linking a halogen-free flame-retardant resin composition comprising a base polymer (B) and a halogen-free flame retardant, the base polymer (A) comprising a thermoplastic resin (a1) having an aromatic ring in the backbone chain and not containing a nitrogen atom and the base polymer (B) comprising a polyolefin component, and the thickness of the inner layer is not less than 0.03 mm and also not more than 70% of the thickness of the insulation layer.

[15] In the insulated wire described in [14], preferably, the thermoplastic resin comprises at least one of polybutylene terephthalate, polyethylene terephthalate, polybutylene naphthalate, polyethylene naphthalate, polyphenylene sulfide, polyphenylene ether, modified polyphenylene ether and polyether ether ketone.

[16] In the insulated wire described in [14] or [15], preferably, the thermoplastic resin comprises at least one of polybutylene terephthalate and polybutylene naphthalate.

[17] In the insulated wire described in any one of [14] to [16], preferably, the halogen-free resin composition used to form the inner layer contains not less than 5 parts by mass and not more than 40 parts by mass of a thermal embrittlement inhibitor (a2) with respect to 100 parts by mass of the base polymer (A), the thermal embrittlement inhibitor (a2) having a lower glass-transition temperature than the thermoplastic resin (a1).

[18] In the insulated wire described in [17], preferably, the thermal embrittlement inhibitor (a2) comprises at least one of a modified polyolefin copolymer, a modified silicone and a modified styrene-based elastomer.

[19] In the insulated wire described in [17] or [18], preferably, the thermal embrittlement inhibitor (a2) has a glass-transition temperature of not more than 20° C.

[20] In the insulated wire described in any one of [17] to [19], preferably, the thermal embrittlement inhibitor (a2) comprises an ethylene-acrylic ester copolymer modified with glycidyl.

[21] In the insulated wire described in any one of [17] to [20], preferably, the thermal embrittlement inhibitor (a2) comprises ethylene glycidyl methacrylate.

[22] In the insulated wire described in any one of [14] to [21], preferably, the polyolefin component comprises not less than 1 part by mass and not more than 40 parts by mass of a polyolefin (b1) having a melting point of not less than 120° C., not less than 5 parts by mass and not more than 40 parts by mass of a polyolefin (b2) having a melting point of less than 120° C. and not less than 5 parts by mass and not more than 50 parts by mass of an acid-modified polyolefin (b3) so that the total amount thereof is 100 parts by mass.

[23] In the insulated wire described in any one of [14] to [22], preferably, the halogen-free flame-retardant resin composition used to form the outer layer contains not less than 100 parts by mass and not more than 250 parts by mass of the halogen-free flame retardant with respect to 100 parts by mass of the base polymer (B).

[24] In the insulated wire described in any one of [14] to [23], preferably, the halogen-free flame retardant comprises a metal hydroxide.

[25] In the insulated wire described in [24], preferably, the metal hydroxide is magnesium hydroxide.

[26] Another aspect of the invention provides a cable, comprising:

a core comprising an insulated wire(s) formed by providing an insulation layer around a conductor; and a sheath provided around the core, wherein the insulation layer comprises an inner layer located on the conductor side and an outer layer provided around the inner layer, the inner layer is formed of a halogen-free resin composition comprising a base polymer (A), the outer layer comprises a cross-linked body obtained by cross-linking a halogen-free flame-retardant resin composition comprising a base polymer (B) and a halogen-free flame retardant, the base polymer (A) comprising a thermoplastic resin (a1) having an aromatic ring in the backbone chain and not containing a nitrogen atom and the base polymer (B) comprising a polyolefin component, and the thickness of the inner layer is not less than 0.03 mm and also not more than 70% of the thickness of the insulation layer.

The invention claimed is:

1. An insulated wire, comprising:
a conductor; and
an insulation layer provided around the conductor,
wherein the insulation layer comprises an inner layer located on the conductor side and an outer layer provided around the inner layer,
wherein the inner layer comprises a halogen-free resin composition comprising a base polymer (A),
wherein the outer layer comprises a cross-linked body obtained by cross-linking a halogen-free flame-retardant resin composition comprising a base polymer (B) and a halogen-free flame retardant,
wherein the base polymer (A) comprises a thermoplastic resin (a1) having an aromatic ring in a backbone chain,
wherein the base polymer (B) comprises a polyolefin component, and
wherein a thickness of the inner layer is not less than 0.03 mm and not more than 70% of a thickness of the insulation layer.

2. The insulated wire according to claim 1, wherein the thermoplastic resin (a1) comprises at least one of polybutylene terephthalate, polyethylene terephthalate, polybutylene naphthalate, polyethylene naphthalate, polyamide, polyetherimide, silicone-modified polyetherimide, polyphenylene sulfide, polyphenylene ether, modified polyphenylene ether and polyether ether ketone.

3. The insulated wire according to claim 1, wherein the halogen-free resin composition used to form the inner layer contains not less than 5 parts by mass and not more than 40 parts by mass of a thermal embrittlement inhibitor (a2) with respect to 100 parts by mass of the base polymer (A), the thermal embrittlement inhibitor (a2) having a lower glass-transition temperature than the thermoplastic resin (a1).

4. The insulated wire according to claim 3, wherein the thermal embrittlement inhibitor (a2) comprises at least one of a modified polyolefin copolymer, a modified silicone and a modified styrene-based elastomer.

5. The insulated wire according to claim 1, wherein the polyolefin component comprises not less than 1 part by mass and not more than 40 parts by mass of a polyolefin (b1) having a melting point of not less than 120° C., not less than 5 parts by mass and not more than 40 parts by mass of a polyolefin (b2) having a melting point of less than 120° C. and not less than 5 parts by mass and not more than 50 parts by mass of an acid-modified polyolefin (b3) such that the total amount thereof is 100 parts by mass.

6. The insulated wire according to claim 1, wherein the halogen-free flame-retardant resin composition used to form the outer layer contains not less than 100 parts by mass and not more than 250 parts by mass of the halogen-free flame retardant with respect to 100 parts by mass of the base polymer (B).

7. The insulated wire according to claim 1, wherein the halogen-free flame retardant comprises a metal hydroxide.

8. A cable, comprising:
a core comprising an insulated wire formed by providing an insulation layer around a conductor; and
a sheath provided around the core,
wherein the insulation layer comprises an inner layer located on a conductor side and an outer layer provided around the inner layer,
wherein the inner layer comprises a halogen-free resin composition comprising a base polymer (A),
wherein the outer layer comprises a cross-linked body obtained by cross-linking a halogen-free flame-retardant resin composition comprising a base polymer (B) and a halogen-free flame retardant,
wherein the base polymer (A) comprises a thermoplastic resin (a1) having an aromatic ring in a backbone chain,
wherein the base polymer (B) comprises a polyolefin component, and
wherein a thickness of the inner layer is not less than 0.03 mm and not more than 70% of a thickness of the insulation layer.

9. An insulated wire, comprising:
a conductor; and
an insulation layer provided around the conductor,
wherein the insulation layer comprises an inner layer located on a conductor side and an outer layer provided around the inner layer,
wherein the inner layer comprises a halogen-free resin composition comprising a base polymer (A),
wherein the outer layer comprises a cross-linked body obtained by cross-linking a halogen-free flame-retardant resin composition comprising a base polymer (B) and a halogen-free flame retardant,
wherein the base polymer (A) comprises a thermoplastic resin (a1) having an aromatic ring in a backbone chain and not including a nitrogen atom,
wherein the base polymer (B) comprising a polyolefin component, and
wherein a thickness of the inner layer is not less than 0.03 mm and not more than 70% of a thickness of the insulation layer.

10. The insulated wire according to claim 9, wherein the thermoplastic resin (a1) comprises at least one of polybutylene terephthalate, polyethylene terephthalate, polybutylene naphthalate, polyethylene naphthalate, polyphenylene sulfide, polyphenylene ether, modified polyphenylene ether and polyether ether ketone.

11. The insulated wire according to claim 9, wherein the halogen-free resin composition used to form the inner layer includes not less than 5 parts by mass and not more than 40 parts by mass of a thermal embrittlement inhibitor (a2) with respect to 100 parts by mass of the base polymer (A), the thermal embrittlement inhibitor (a2) having a lower glass-transition temperature than the thermoplastic resin (a1).

12. The insulated wire according to claim 11, wherein the thermal embrittlement inhibitor (a2) comprises at least one of a modified polyolefin copolymer, a modified silicone and a modified styrene-based elastomer.

13. The insulated wire according to claim 9, wherein the polyolefin component comprises not less than 1 part by mass and not more than 40 parts by mass of a polyolefin (b1) having a melting point of not less than 120° C., not less than 5 parts by mass and not more than 40 parts by mass of a polyolefin (b2) having a melting point of less than 120° C. and not less than 5 parts by mass and not more than 50 parts by mass of an acid-modified polyolefin (b3) such that the total amount thereof is 100 parts by mass.

14. The insulated wire according to claim 9, wherein the halogen-free flame-retardant resin composition used to form the outer layer contains not less than 100 parts by mass and not more than 250 parts by mass of the halogen-free flame retardant with respect to 100 parts by mass of the base polymer (B).

15. The insulated wire according to claim 9, wherein the halogen-free flame retardant comprises a metal hydroxide.

16. A cable, comprising:
a core comprising an insulated wire formed by providing an insulation layer around a conductor; and
a sheath provided around the core,
wherein the insulation layer comprises an inner layer located on a conductor side and an outer layer provided around the inner layer,
wherein the inner layer comprises a halogen-free resin composition comprising a base polymer (A),
wherein the outer layer comprises a cross-linked body obtained by cross-linking a halogen-free flame-retardant resin composition comprising a base polymer (B) and a halogen-free flame retardant,
wherein the base polymer (A) comprises a thermoplastic resin (a1) having an aromatic ring in a backbone chain and not including a nitrogen atom,
wherein the base polymer (B) comprises a polyolefin component, and
wherein a thickness of the inner layer is not less than 0.03 mm and not more than 70% of a thickness of the insulation layer.

* * * * *